(12) United States Patent
Lee

(10) Patent No.: US 11,631,273 B2
(45) Date of Patent: *Apr. 18, 2023

(54) ELECTRONIC APPARATUS AND METHOD OF PROCESSING FINGERPRINT IMAGE

(71) Applicant: SAMSUNG ELECTRONICS CO., LTD., Suwon-si (KR)

(72) Inventor: Huijin Lee, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,570

(22) Filed: Oct. 14, 2021

(65) Prior Publication Data

US 2022/0067338 A1 Mar. 3, 2022

Related U.S. Application Data

(63) Continuation of application No. 16/830,667, filed on Mar. 26, 2020, now Pat. No. 11,176,350.

(30) Foreign Application Priority Data

Aug. 27, 2019 (KR) ........................ 10-2019-0105002

(51) Int. Cl.
*G06V 40/12* (2022.01)
*G06V 40/13* (2022.01)

(52) U.S. Cl.
CPC .......... *G06V 40/1347* (2022.01); *G06V 40/13* (2022.01)

(58) Field of Classification Search
None
See application file for complete search history.

(56) References Cited

U.S. PATENT DOCUMENTS

| | | | |
|---|---|---|---|
| 7,110,581 B2 | 9/2006 | Xia et al. |
| 9,971,456 B2 | 5/2018 | Abileah et al. |
| 10,509,944 B2 | 12/2019 | Yoshii et al. |
| 2011/0129149 A1 | 6/2011 | Kang et al. |
| 2011/0188774 A1 | 8/2011 | Song et al. |
| 2013/0135520 A1 | 5/2013 | Sugimoto et al. |
| 2014/0015830 A1 | 1/2014 | Hong et al. |
| 2015/0332120 A1 | 11/2015 | Litvak et al. |
| 2018/0060639 A1 | 3/2018 | Lee et al. |

(Continued)

FOREIGN PATENT DOCUMENTS

| | | |
|---|---|---|
| KR | 10-2010-0009260 A | 1/2010 |
| KR | 10-2018-0098443 A | 9/2018 |

OTHER PUBLICATIONS

S. Chikkeru et al., "Fingerprint Image Enhancement Using STFT Analysis", 2005, pp. 20-29.

(Continued)

*Primary Examiner* — Nicholas J Lee
(74) *Attorney, Agent, or Firm* — Sughrue Mion, PLLC

(57) ABSTRACT

A method of processing a fingerprint image in an electronic apparatus includes: obtaining an original fingerprint image by sensing a fingerprint of a user; estimating a spatial change trend of original contrast values in the original fingerprint image; generating a reference contrast map based on the estimated spatial change trend; normalizing a contrast distribution of the original fingerprint image based on the reference contrast map, and generating a normalization fingerprint image having a normalized contrast distribution.

20 Claims, 11 Drawing Sheets

(56) References Cited

U.S. PATENT DOCUMENTS

2019/0180078 A1    6/2019  Hall

OTHER PUBLICATIONS

Communication dated Aug. 25, 2020 by the European Patent Office in counterpart European Patent Application No. 20170872.4.
Osvaldo Pereira et al., "Edge Detection based on Kernel Density Estimation", arxiv.org, Cornell University Library, Nov. 5, 2014, XP081402511.
G. Arunalatha et al., "Fingerprint Spoof Detection Using Quality Features", International Journal of Security and Its Applications, vol. 9, No. 10, Oct. 31, 2015, pp. 83-94, XP055722782.
Girardin, "Fingerprint Sensor Applications and Technologies—Consumer Market Focus," Yole Développement, Market & Technology Report, Jan. 2017 (Total 5 pages).

FIG. 7
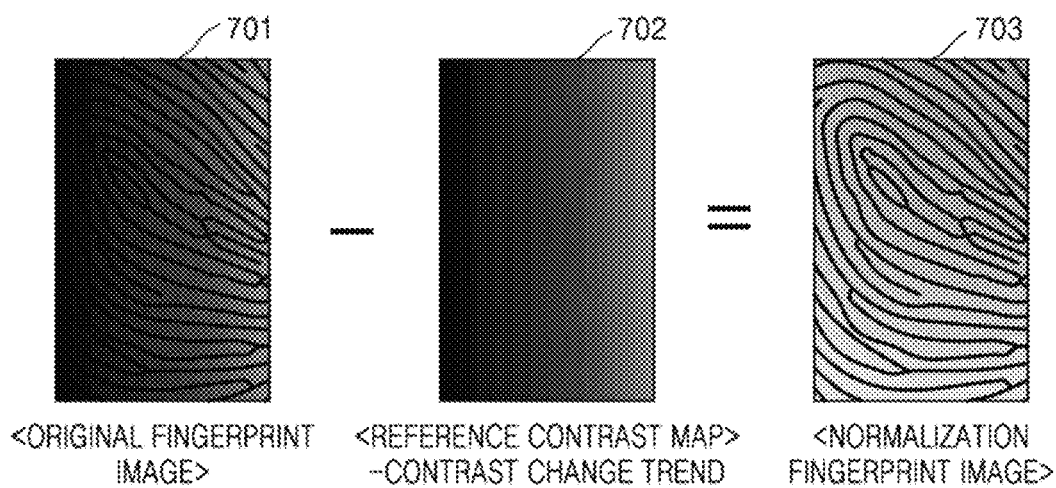
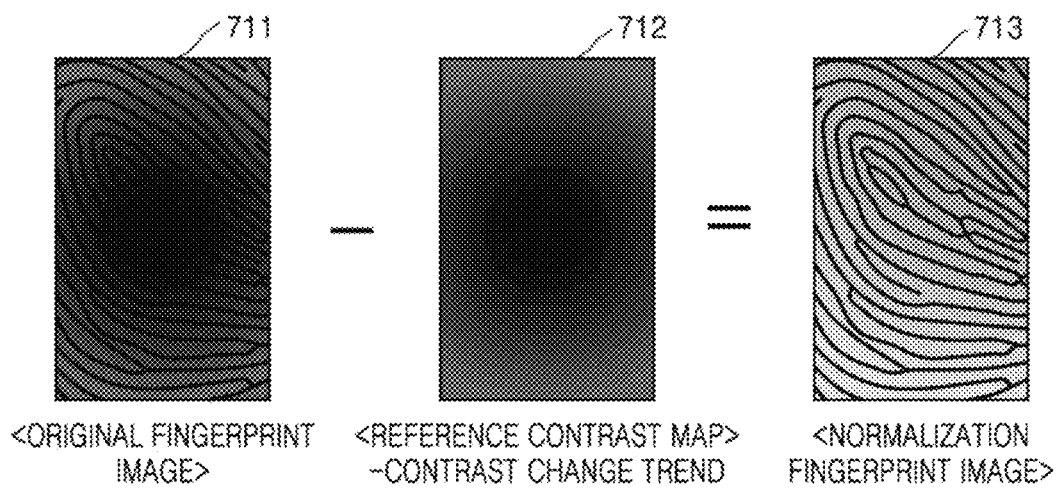

FIG. 11

ELECTRONIC APPARATUS AND METHOD OF PROCESSING FINGERPRINT IMAGE

CROSS-REFERENCE TO RELATED APPLICATION

This application is a continuation of U.S. patent application Ser. No. 16/830,667, filed on Mar. 26, 2020, which claims priority from Korean Patent Application No. 10-2019-0105002, filed on Aug. 27, 2019 in the Korean Intellectual Property Office, the disclosures of which are incorporated herein by reference in their entireties.

BACKGROUND

1. Field

Apparatuses and methods consistent with example embodiments relate to processing fingerprint images in electronic apparatuses.

2. Description of Related Art

Demands for performing personal authentication based on the features of a person such as a fingerprint, voice, a face, a hand, or an iris are gradually increasing. Personal authentication functions are mainly used in financial devices, access control devices, mobile devices, laptops, etc. Recently, as mobile devices such as smartphones have become widespread, fingerprint recognition technology for personal authentication has been widely adopted to protect a large amount of security information stored in smartphones.

SUMMARY

Provided are electronic apparatuses and methods of processing fingerprint images in the electronic apparatuses. The technical objective of the present embodiment is not limited to the above-described technical objective, and other technical objectives may be inferred from embodiments below.

Additional aspects will be set forth in part in the description which follows and, in part, will be apparent from the description, or may be learned by practice of the presented embodiments of the disclosure.

According to an aspect of an embodiment, there is provided a method of processing a fingerprint image in an electronic apparatus, including: obtaining an original fingerprint image by sensing a fingerprint of a user; estimating a spatial change trend of original contrast values of pixels of the original fingerprint image from the original fingerprint image based on a contrast distribution of the original contrast values; generating a reference contrast map indicating reference contrast values regarding the pixels determined based on the estimated spatial change trend; normalizing the contrast distribution of the original fingerprint image by comparing the original contrast values of the original fingerprint image with the reference contrast values of the reference contrast map; and generating a normalization fingerprint image having the normalized contrast distribution.

According to an aspect of another embodiment, a non-transitory computer readable storage medium storing a program that is executable by a computer to perform the method is included.

According to an aspect of another embodiment, an electronic apparatus for processing a fingerprint image, includes: a fingerprint sensor configured to obtain an original fingerprint image by sensing a fingerprint of a user; and a processor configured to estimate a spatial change trend of original contrast values of pixels of the original fingerprint image from the original fingerprint image based on a contrast distribution of the original contrast values, generate a reference contrast map indicating reference contrast values regarding the pixels determined based on the estimated spatial change trend, normalize the contrast distribution of the original fingerprint image by comparing the original contrast values of the original fingerprint image with the reference contrast values of the reference contrast map, and generate a normalization fingerprint image having the normalized contrast distribution.

BRIEF DESCRIPTION OF THE DRAWINGS

The above and/or other aspects will be more apparent by describing certain example embodiments, with reference to the accompanying drawings, in which:

FIG. 7 is a diagram for describing a process of performing normalization on a fingerprint image, according to an embodiment;

FIG. 11 is a diagram for comparing fingerprint recognition rates according to a result of image processing in the related art and the present embodiment, with respect to an original fingerprint image having a non-uniform contrast distribution according to an embodiment.

DETAILED DESCRIPTION

Figure 1:
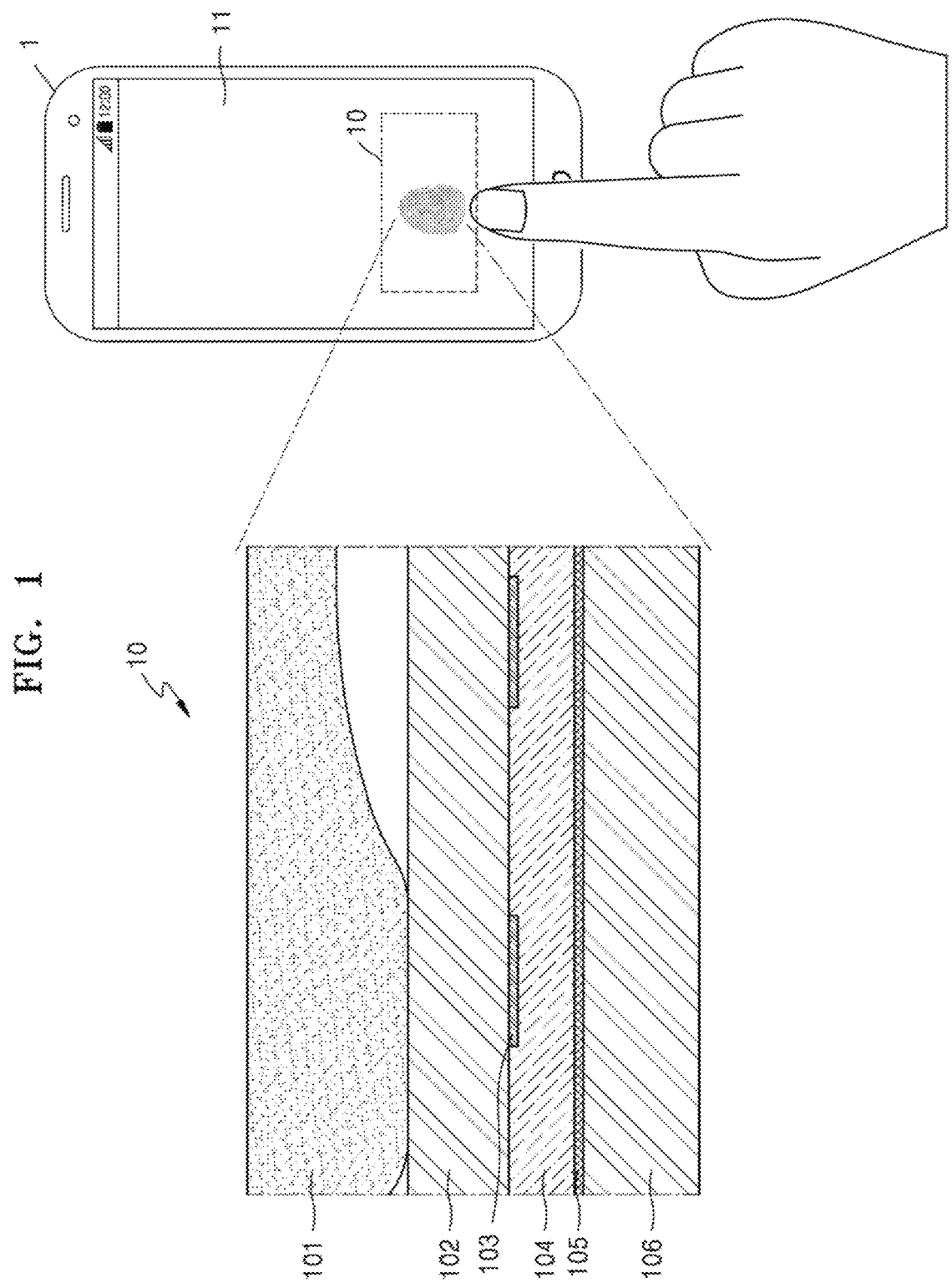
FIG. 1 illustrates an example of a fingerprint sensor mounted in an electronic apparatus, according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

In embodiments set forth herein, general terms that have been widely used nowadays are selected, if possible, but non-general terms may be selected according to the intentions of technicians in the this art, precedents, or new technologies, etc. Some terms may be arbitrarily chosen by the applicant. In this case, the meanings of these terms will be explained in corresponding parts of the disclosure in detail. Thus, the terms used herein should be defined not based on the names thereof but based on the meanings thereof and the whole context of the embodiments.

The terms "comprises", "comprising", "includes", and "including" used herein should not be construed as necessarily including all various elements or operations described herein and it should be understood that some of the elements or operations may be omitted or additional elements or operations may be further provided.

Hereinafter, embodiments will be described in detail with reference to the accompanying drawings. However, embodiments may be embodied in many different forms and should not be construed as limited to the examples set forth herein.

FIG. 1 illustrates an example of a fingerprint sensor mounted in an electronic apparatus, according to an embodiment.

Referring to FIG. 1, a fingerprint sensor 10 of an electronic apparatus 1 may include a plurality of layers, including a passivation layer 102, an insulating layer 104, and a substrate 106. The fingerprint sensor 10 may further include a detection electrode Rx 103 that is positioned between the passivation layer 102 and the insulating layer 104, and a drive electrode Tx 105 that is positioned between the insulating layer 104 and the substrate 106.

A touch display panel 11 may be provided on a front surface of the electronic apparatus 1, and the touch display panel 11 may correspond to a touch input interface for manipulating the electronic apparatus 1. A portion from among the entire regions of the touch display panel 11 may operate as the fingerprint sensor 10 for sensing a fingerprint of a fingertip 101 of a user. The fingerprint sensor 10 may recognize a fingerprint pattern of a user by acquiring a fingerprint image of the user by detecting different mutual capacitances to a ridge and a valley, that is, a difference in the amount of change in mutual capacitances, and identify a fingerprint of the user.

Meanwhile, for convenience of description, the fingerprint sensor 10 is illustrated as corresponding to a portion of the touch display panel 11 on the front surface of the electronic apparatus 1. However, the disclosure is not limited thereto, and the fingerprint sensor 10 according to the present embodiment may be implemented at various positions such as on a back surface or a lateral surface of the electronic apparatus 1 or in another region different from the touch display panel 11.

The electronic apparatus 1 is a computing device including the fingerprint sensor 10, and may be, for example, a personal computer (PC), a laptop, a mobile device, or the like, or also an autonomous vehicle, robotics, a smartphone, a tablet device, an augmented reality (AR) device, an Internet of Things (IoT) device, but is not limited thereto, and may be various types of devices.

Figure 2:
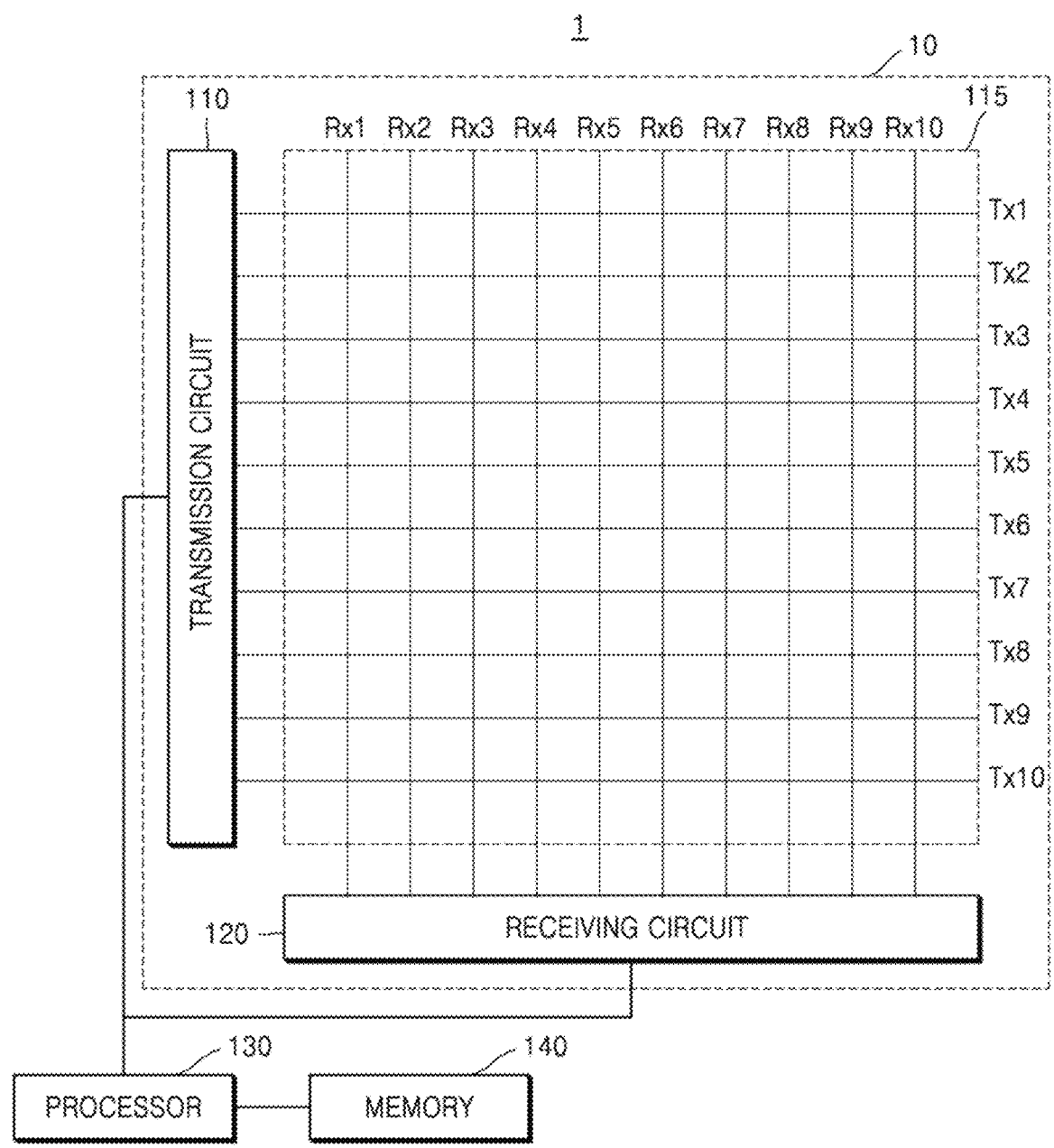
FIG. 2 illustrates hardware components of an electronic apparatus according to an embodiment.

FIG. 2 illustrates hardware components of the electronic apparatus according to an embodiment.

Referring to FIG. 2, the electronic apparatus 1 may include the fingerprint sensor 10 including a transmission circuit 110, a touch panel 115, and a receiving circuit 120, and a processor 130 and a memory 140. Although FIG. 2 illustrates constituent elements of the fingerprint sensor 10, one of ordinary skill in the art would understand that additional elements may be further included therein.

The processor 130 may be embodied by an array of a plurality of logic gates, or by a combination of a universal microprocessor and a memory in which a program executable by the microprocessor is stored. The processor 130 may include at least one processor (or processing unit). Furthermore, one of ordinary skill in the art would understand that the processor 130 may be embodied by hardware configurations in any other arbitrary form.

The touch panel 115 may include a plurality of drive electrodes Tx and a plurality of detection electrodes Rx formed in a direction crossing the plurality of drive electrodes Tx. Although FIG. 2 illustrates that, for convenience of explanation, the number of each of the plurality of drive electrodes Tx and the plurality of detection electrodes Rx are ten, the disclosure is not limited thereto, and the numbers of the plurality of drive electrodes Tx and the plurality of detection electrodes Rx may be varied.

The transmission circuit 110 may include a module applying a drive signal to the plurality of drive electrodes Tx, and the receiving circuit 120 may include a module measuring an electric signal from the plurality of detection electrodes Rx.

The drive electrodes Tx and the detection electrodes Rx of the touch panel 115 may extend in direction crossing each other. Although FIG. 2 illustrates an embodiment in which the drive electrodes Tx and the detection electrodes Rx are orthogonal to each other, the disclosure is not limited thereto. In other words, an angle between the direction in which the drive electrodes Tx extend and the direction in which the detection electrodes Rx extend may greater or less than 90°.

When a user's finger approaches the touch panel 115, mutual capacitance between each of the drive electrodes Tx and the detection electrodes Rx of the touch panel 115 may vary. For example, the mutual capacitance at each of nodes at which the drive electrodes Tx and the detection electrodes Rx cross each other in the touch panel 115 may be different from each other based on the characteristics of a fingerprint pattern of the user's finger. As an interval between the drive electrodes Tx and an interval between the detection electrodes Rx decrease, a sensing resolution for sensing a fingerprint region may increase.

The drive electrodes Tx and the detection electrodes Rx may be provided as line electrodes. Furthermore, each of the drive electrodes Tx may further include patterns provided between the nodes at which the drive electrodes Tx and the detection electrodes Rx cross each other. The patterns may have various shapes such as a polygon or a circle. Likewise, each of the detection electrodes Rx may further include patterns provided between the nodes.

The transmission circuit 110 may apply a drive signal to the drive electrodes Tx. For example, the transmission circuit 110 may apply a voltage pulse to each of the drive electrodes Tx. The receiving circuit 120 may obtain an electric signal from the detection electrodes Rx. In this state, the receiving circuit 120 may obtain a current flowing in each of the detection electrodes Rx or measure an electric potential of each of the detection electrodes Rx.

The processor 130 may control overall operations of the transmission circuit 110 and the receiving circuit 120 included in the fingerprint sensor 10. For example, the processor 130 may control the amplitude and duration of a voltage pulse that is applied by the transmission circuit 110 to each of the drive electrodes Tx. Furthermore, the processor 130 may control the transmission circuit 110 such that a voltage pulse can be applied to some of the drive electrodes Tx.

The processor 130 may generate and process fingerprint image data related to a fingerprint of the user or minutiae data of the user by using the current or electric potential that is received by the receiving circuit 120. For example, the processor 130 may obtain and process fingerprint image data corresponding to the fingerprint region by using the current or electric potential that is received by the receiving circuit 120, and process user authentication by analyzing pixel values included in the fingerprint image data.

The memory 140 may store a computer program necessary for the operation of the processor 130. For example, the processor 130 may read the computer program stored in the memory 140 and perform operation based on instructions in the computer program stored in the memory 140. Furthermore, the memory 140 may store data and information generated based on operation of the touch panel 115, the transmission circuit 110, the receiving circuit 120, and the processor 130. Although FIG. 2 illustrates that the electronic apparatus 1 includes one memory as the memory 140, the disclosure is not limited thereto, and the electronic apparatus 1 may include two or more memories according to necessity.

Figure 3:
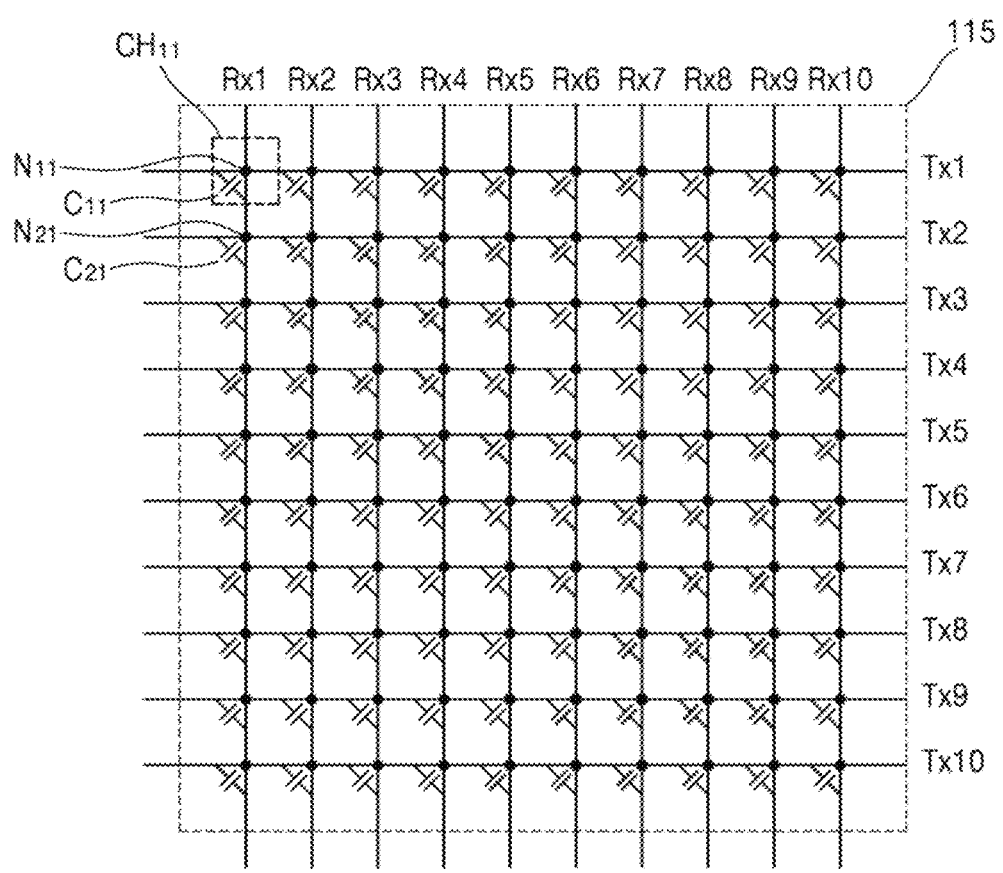
FIG. 3 conceptually illustrates a mutual capacitance corresponding to each of nodes of a touch panel according to an embodiment.

FIG. 3 conceptually illustrates mutual capacitance corresponding to each of nodes of a touch panel according to an embodiment.

Referring to FIG. 3, the mutual capacitance between the drive electrodes Tx and the detection electrodes Rx may correspond to capacitance at the nodes at which the drive electrodes Tx and the detection electrodes Rx cross each other.

For example, mutual capacitance $C_{11}$ between a first drive electrode Tx1 and a first detection electrode Rx1 may correspond to capacitance at a node $N_{11}$ at which the first drive electrode Tx1 and the first detection electrode Rx1 cross each other. Likewise, mutual capacitance $C_{mn}$ between an m-th drive electrode Txm, where m is a natural number, and an n-th detection electrode Rxn, where n is a natural number, may correspond to capacitance at a node $N_{mn}$ where the m-th drive electrode Txm and the n-th detection electrode Rxn cross each other. In the following description, mutual capacitance at the node $N_{mn}$ denotes the mutual capacitance between the m-th drive electrode Txm and the n-th detection electrode Rxn.

A plurality of channels may be defined in the touch panel 115 by the drive electrodes Tx and the detection electrodes Rx. For example, a certain channel may correspond to a node that is defined by a drive electrode Tx and a detection electrode Rx crossing each other. For example, a channel $CH_{11}$ may correspond to the node $N_{11}$.

Different drive signals may be sequentially applied to each of the drive electrodes Tx to obtain mutual capacitance at each of a plurality of nodes. Furthermore, an electric signal may be individually obtained at each of the detection electrodes Rx. For example, when the mutual capacitance $C_{11}$ is to be obtained, a drive signal may be applied only to the first drive electrode Tx1, and an electric signal may be obtained at the first detection electrode Rx1. Likewise, when the mutual capacitance $C_{mn}$ is to be obtained, a drive signal is applied only to the m-th drive electrode Txm, and an electric signal may be obtained at the n-th detection electrode Rxn.

Figure 4:
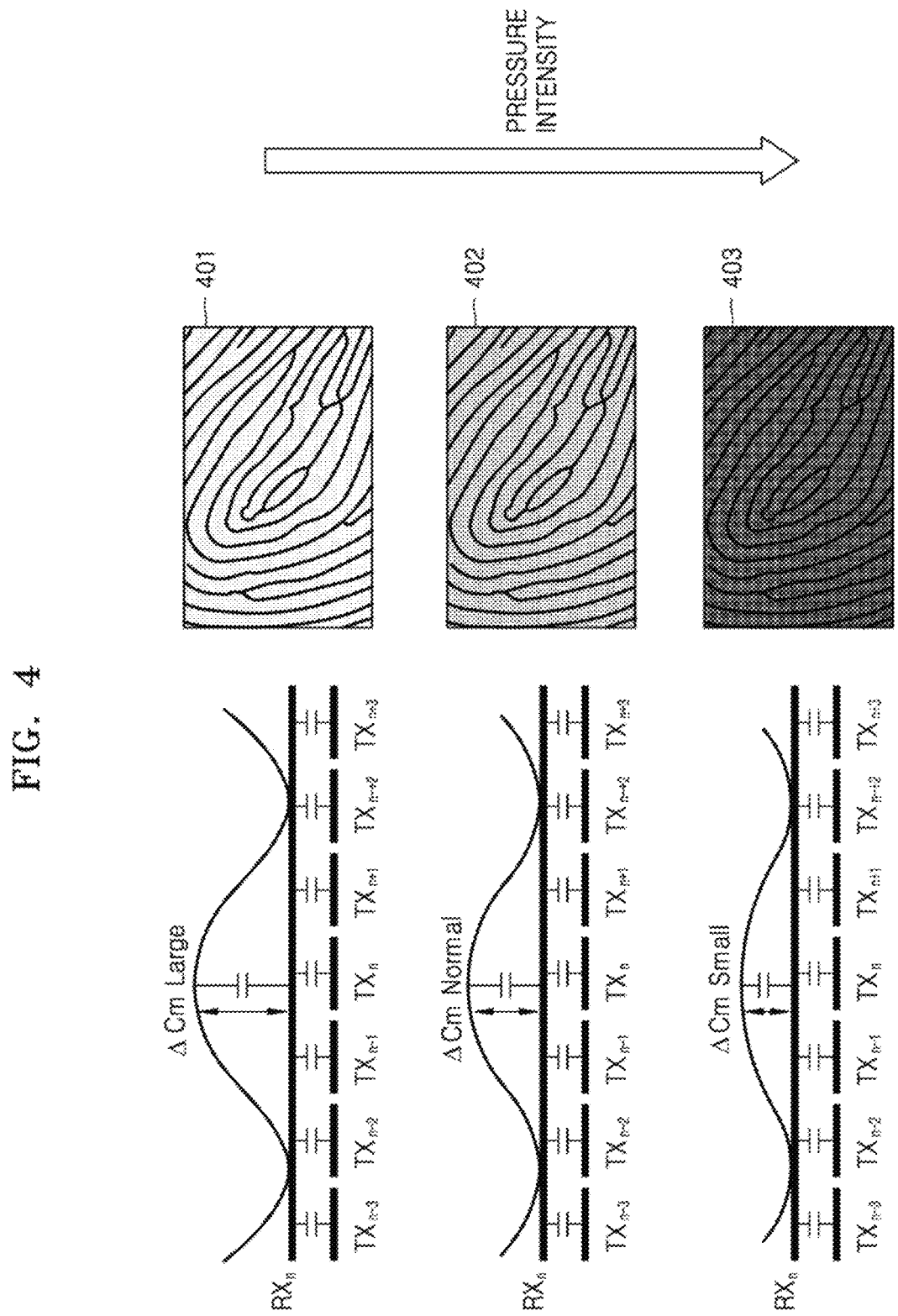
FIG. 4 is a diagram for describing fingerprint images corresponding to different pressure intensities of a user's fingers contacting a fingerprint sensor according to an embodiment.

FIG. 4 is a diagram for describing fingerprint images corresponding to different pressure intensities of a user's finger contacting a fingerprint sensor according to an embodiment.

The fingerprint sensor 10 (FIG. 1) generates a fingerprint image by detecting a difference $\Delta C_M$ in an amount of change in mutual capacitance between a ridge and a valley of a fingerprint of a user. Referring to FIG. 4, based on a case in which a user has contacted the finger on the fingerprint sensor 10 at a normal pressure intensity (e.g., when the user applies a pressure that is higher than a predetermined low pressure threshold and lower than a predetermined high pressure threshold), a case in which the finger is contacted at a higher pressure intensity than the normal pressure intensity (e.g., when the user applies a pressure higher than the predetermined high pressure threshold), and a case in which the finger is contacted at a lower pressure intensity than the normal pressure intensity (e.g., when the user applies a pressure lower than the predetermined lower pressure threshold) are illustrated.

When the finger is contacted on the fingerprint sensor 10 with the normal pressure intensity, a fingerprint image 402 based on a difference $\Delta C_M$ Normal in the amount of change in mutual capacitance may be generated. In comparison with this, when the finger is contacted on the fingerprint sensor 10 with a higher pressure intensity than the normal pressure intensity, a fingerprint image 401 based on a difference $\Delta C_M$ Large in an amount of change in mutual capacitance may be generated, and the overall contrast of the fingerprint image 401 is greater than a contrast of the fingerprint image 402. On the contrary, when the finger is contacted on the fingerprint sensor 10 with a lower pressure intensity than the normal pressure intensity, a fingerprint image 403 based on a difference $\Delta C_M$ Small in an amount of change in mutual capacitance may be generated, and the overall contrast of the fingerprint image 403 is lower than a contrast of the fingerprint image 402.

That is, a contrast distribution of a fingerprint image may be varied according to a pressure intensity at which the user contacts the finger on the fingerprint sensor 10. This is because a height difference between a ridge and a valley varies in a fingerprint according to a pressure intensity. Accordingly, even when the same finger is contacted, fingerprint images of different qualities may be obtained depending on the pressure intensity at which the finger is contacted, and such different qualities of the fingerprint images may affect fingerprint authentication of the user.

Figure 5:
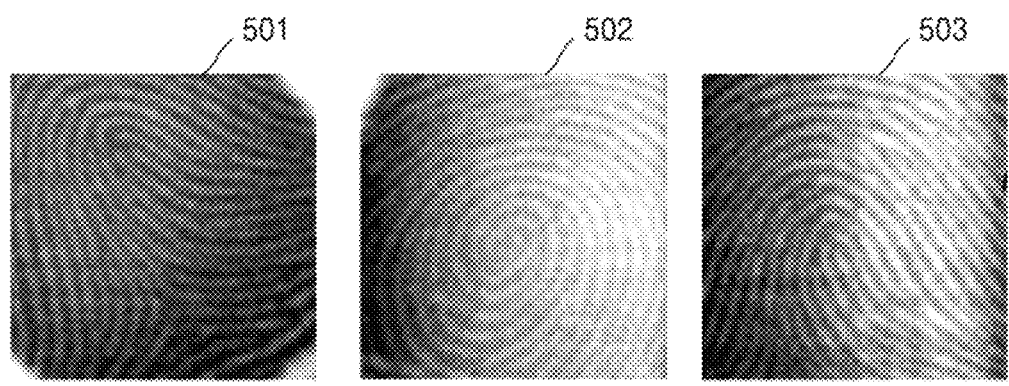
FIG. 5 is a diagram for describing a case in which a pressure of a finger contacting a fingerprint sensor is not uniformly distributed in the fingerprint sensor, according to an embodiment.

FIG. 5 is a diagram for describing a case in which a pressure of a finger contacting a fingerprint sensor is not uniformly distributed in the fingerprint sensor, according to an embodiment.

Referring to FIG. 5, when a user contacts a finger on the fingerprint sensor 10 (FIG. 1), the force of the finger may not be uniformly distributed on the fingerprint sensor 10, and thus, fingerprint images 501, 502, and 503 with non-uniform contrast distributions may be obtained. For example, the fingerprint image 501 having a contrast distribution in which the lower part is dark and the upper part is bright may be obtained, or the fingerprint image 502 or 503 in which the contrast is different between the left and the right may be obtained. When a contrast distribution is not uniform, accurate fingerprint pattern information is not extracted when processing a fingerprint image, and thus, performance of fingerprint authentication may be degraded.

According to the related art, a contrast stretching technique, a histogram equalization technique or the like has been suggested as a pre-processing to improve a non-uniform contrast distribution in a fingerprint image. In these techniques, a contrast value concentrated on a particular region in a fingerprint image is normalized to a distribution of the entire fingerprint image. However, there is a slight difference in that in the contrast stretching technique, normalization is performed by using a ratio between a minimum value and a maximum value from among pixel values in a fingerprint image, and the histogram equalization technique is performed by equalizing original pixel values to pixel values of 0 to 255. However, when an image has an irregular contrast distribution and contrast values thereof are in a broad range, the effect of normalization from the contrast stretching technique or the histogram equalization technique according to the related art may be small. Thus, regardless of a non-uniform contrast distribution of a fingerprint image, a method of efficiently normalizing a contrast distribution of a fingerprint image is required.

Figure 6:
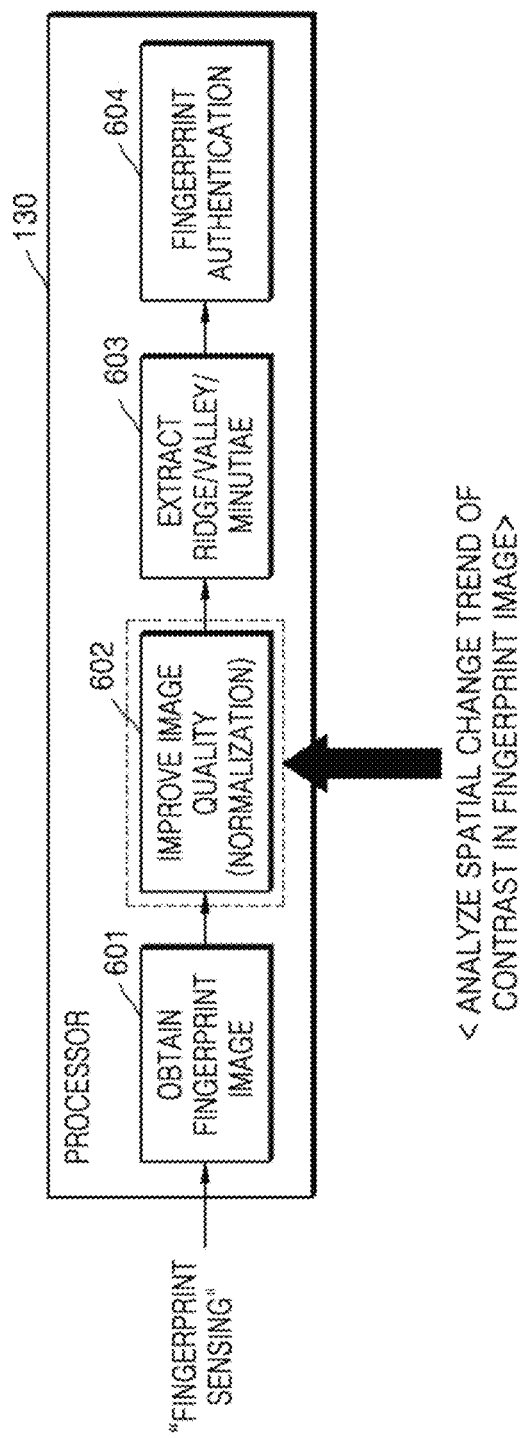
FIG. 6 is a diagram for describing a process of performing fingerprint authentication in a processor of an electronic apparatus, according to an embodiment.

FIG. 6 is a diagram for describing a process of performing fingerprint authentication in a processor of an electronic apparatus, according to an embodiment.

Referring to FIG. 6, in operation 601, the processor 130 obtains a fingerprint image from a fingerprint of a user sensed using the fingerprint sensor 10.

In operation 602, the processor 130 performs an image normalization process on the fingerprint image as a pre-processing to improve an image quality of the obtained fingerprint image. For example, the image normalization process may include a process of normalizing a contrast distribution of a fingerprint image and other image quality improvement processes such as a noise filtering process.

In operation 603, the processor 130 extracts fingerprint pattern information such as a ridge, a valley, minutiae or the like from a pre-processed fingerprint image. In detail, first, the processor 130 may binarize a fingerprint image through bandpass filtering on the pre-processed fingerprint image and extract fingerprint pattern information related to a ridge, a valley, minutiae or the like from the binarized fingerprint image.

In operation 604, the processor 130 performs user authentication based on the fingerprint pattern information extracted from the fingerprint image.

Meanwhile, in an image quality process of operation 602, the processor 130 according to the present embodiment analyzes a spatial change trend of a contrast in the obtained fingerprint image and normalizes a contrast distribution of the fingerprint image according to the analyzed change trend of the contrast. Hereinafter, a method of processing a fingerprint image according to the present embodiment will be described in detail.

FIG. 7 is a diagram for describing a process of performing normalization on a fingerprint image, according to an embodiment.

According to the present embodiment, normalization of a fingerprint image may refer to a process of adjusting contrast values of pixels of a fingerprint image to have an overall uniform distribution in the fingerprint image.

Referring to FIG. 7, an original fingerprint image 701 is an image of a fingerprint of a user that is obtained from the fingerprint sensor 10 without additional image processing, such as pre-processing or post-processing. As described above, fingerprint areas of the original fingerprint image 701 may have a non-uniform contrast distribution due to the characteristics of a finger of the user or a pressure intensity of the contacting finger.

The processor 130 (FIG. 2) estimates a spatial change trend of original contrast values from the original fingerprint image 701 and generates a reference contrast map 702 based on the estimated spatial change trend.

The reference contrast map 702 is information indicating a spatial change trend estimated based on characteristics of a probabilistic contrast distribution of the original fingerprint image 701. Pixels of the reference contrast map 702 may have reference contrast values for indicating the estimated spatial change trend, and each pixel of the reference contrast map 702 may correspond to each pixel of the original fingerprint image 701 based on a one-on-one correspondence. The reference contrast map 702 may represent a distribution of contrast values over the area of the original fingerprint image 701. The reference contrast map 702 may be provided in a three-dimensional space having x, y, and z parameters, wherein x and y parameters indicate pixel coordinates of the original fingerprint image 701 and z parameter indicates contrast values of the original fingerprint image 701.

The processor 130 generates a normalization fingerprint image 703 having a uniform contrast distribution by removing the effect of a change in a contrast according to a contrast change trend (or a spatial change trend of the contrast) of the reference contrast map 702 from the contrast distribution of the original fingerprint image 701.

According to this method, even a fingerprint image has a differently non-uniform contrast distribution like the original fingerprint image 711, the normalization fingerprint image 713 having a uniform contrast distribution may be generated by removing the effect of the change in the contrast according to the contrast change trend (or a spatial change trend of the contrast) in the reference contrast map 712 analyzed from the original fingerprint image 711.

Figure 8:
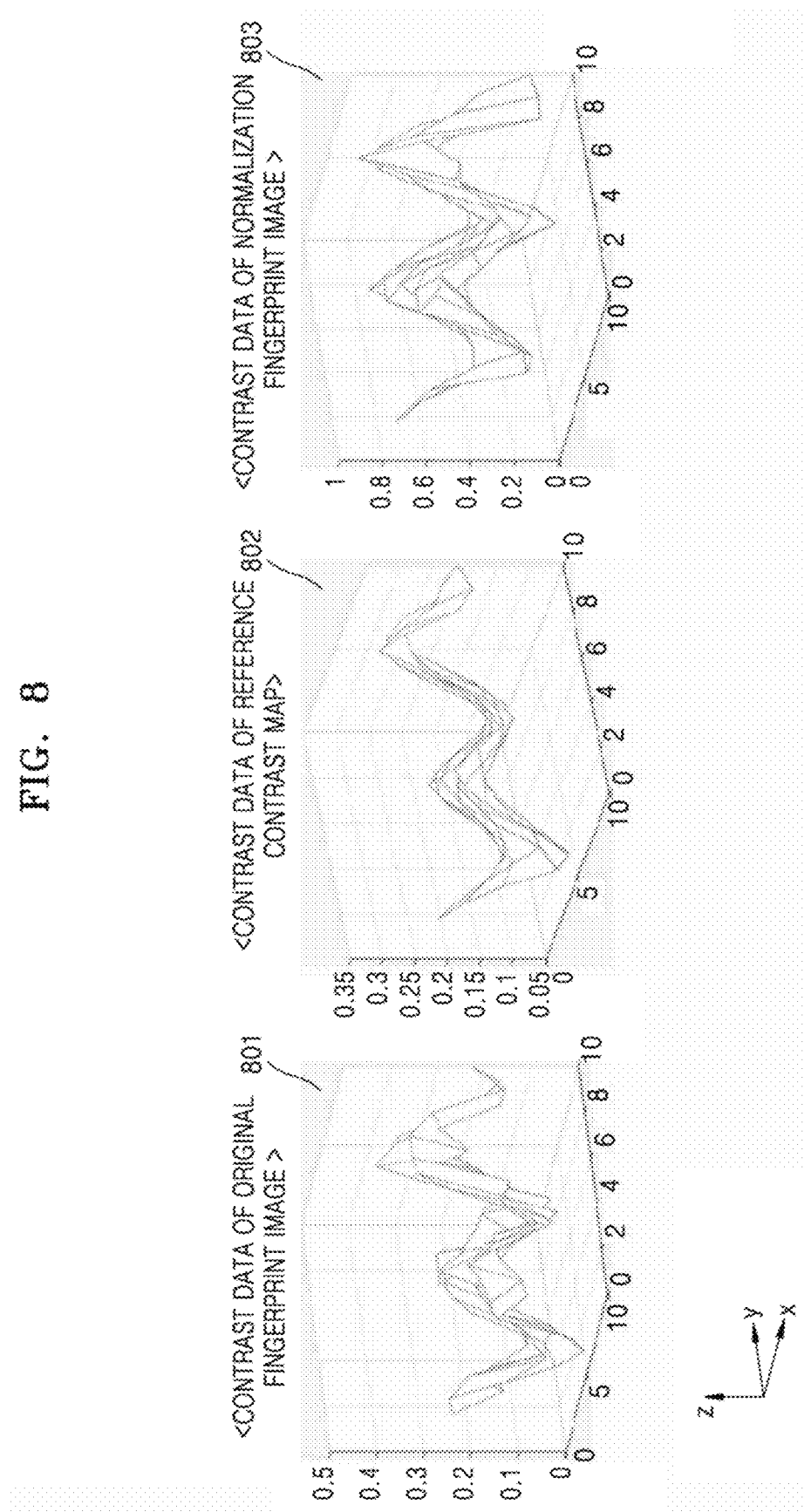
FIG. 8 is a diagram for describing contrast data of a fingerprint image, adjusted by normalization of a contrast distribution, according to an embodiment.

FIG. 8 is a diagram for describing contrast data of a fingerprint image, adjusted by normalization of a contrast distribution, according to an embodiment.

Referring to FIG. 8, an original contrast map 801 is contrast data in which contrast values regarding a partial region of an original fingerprint image are plotted on a three-dimensional (x, y, z) graph. In the original contrast map 801, an x-axis and a y-axis refer to pixel coordinates in the original fingerprint image, and a z-axis refers to a relative contrast value. According to the original contrast map 801, z-values of ridges (that is, contrast values) and z-values of valleys (that is, contrast values) that are not uniform due to a non-uniform contrast distribution in the original fingerprint image may be identified.

The reference contrast map 802 is contrast data having a spatial change trend estimated based on characteristics of a probabilistic contrast distribution of the original fingerprint image. In the reference contrast map 802, an x-axis and a y-axis denote pixel coordinates corresponding to pixel coordinates in the original fingerprint image, and a z-axis denotes an estimated contrast value indicating an estimated spatial change trend.

Contrast data of reference contrast values of the reference contrast map 802 may be obtained by performing kernel density estimation (KDE) by using a kernel function, on a contrast distribution of the original fingerprint image. As the kernel function, various types of functions such as Uniform, Triangle, Epanechnikov, Quartic, Triweight, Gaussian, Cosine or the like may be used.

In a process of calculating a reference contrast value in any one pixel of the reference contrast map 802, probabilistic distribution characteristics of a contrast value of the pixel may be estimated as expressed in Equation 1 below. That is, Equation 1 may indicate a calculation to obtain a result value of smoothing performed with respect to a pixel value of the pixel.

$$\hat{f}_h(x) = \frac{1}{n}\sum_{i=1}^{n} K_h(x - x_i) \quad \text{[Equation 1]}$$

Referring to Equation 1, x denotes a pixel value (contrast value), K denotes a kernel function, and n denotes the number of pieces of sample data (the number of pixels around the pixel). The number of pieces of sample data, n, may be modified by various factors such as processing performance of the processor 130, a smoothing degree, the type of a kernel function, or the like.

A reference contrast value of each pixel of the reference contrast map 802 may be obtained by performing the calculation using Equation 1 on each pixel of the original contrast map 801 of the original fingerprint image. Contrast data of the reference contrast map 802 having estimated reference contrast values may ultimately indicate a spatial contrast change trend of the original fingerprint image (or the original contrast map 801).

The normalization contrast map 803 indicates contrast data of a normalization fingerprint image. The normalization contrast map 803 may be generated from a difference between the original contrast map 801 and the reference contrast map 802. In detail, contrast normalization of a fingerprint image may be performed by calculating a difference (7) in contrast values of pixels between the contrast data of the original contrast map 801 and the contrast data of the reference contrast map 802. Accordingly, the contrast data of the normalization contrast map 803 may have contrast values (z-axis values) having an overall uniform contrast distribution, and accordingly, a normalization fingerprint image having a uniform contrast distribution may be generated.

Figure 9:
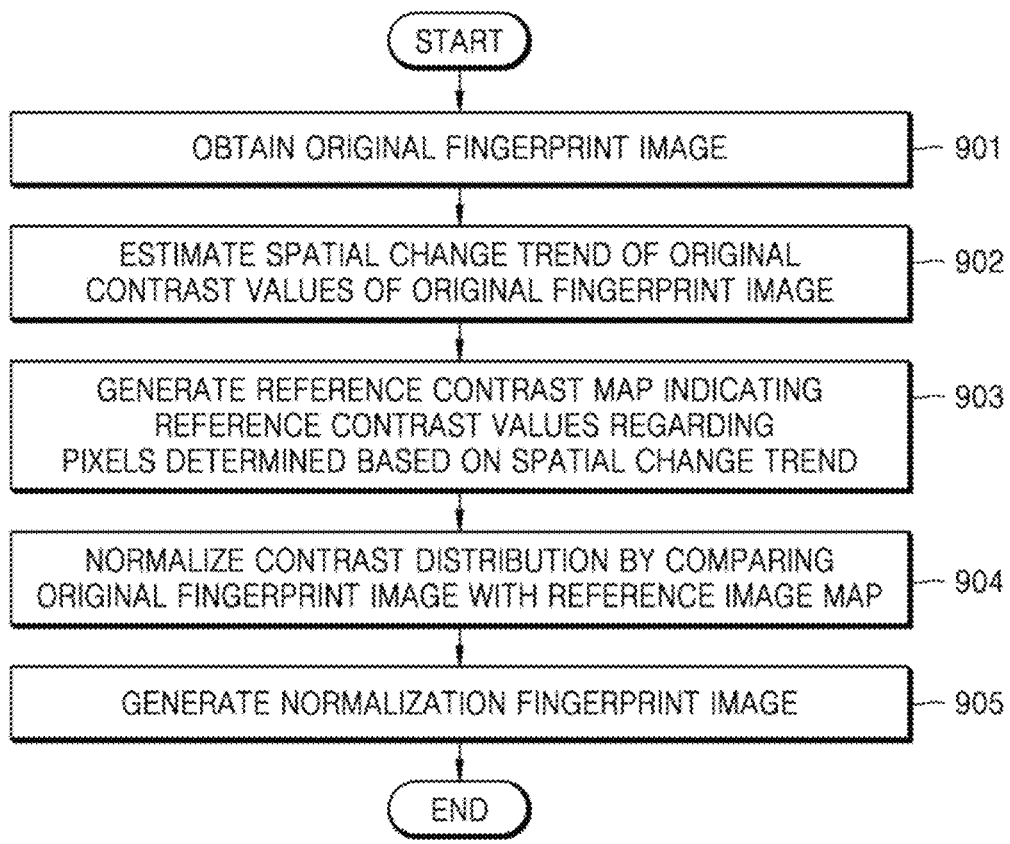
FIG. 9 is a flowchart of a method of processing a fingerprint image in an electronic apparatus, according to an embodiment.

FIG. 9 is a flowchart of a method of processing a fingerprint image in an electronic apparatus, according to an embodiment.

Referring to FIG. 9, the method of processing a fingerprint image in an electronic apparatus includes operations processed in time series in the electronic apparatus 1 described above. Thus, the description provided above with reference to the drawings but omitted here may also apply to the method of FIG. 9.

In operation 901, the processor 130 obtains an original fingerprint image by sensing a fingerprint of a user. A fingerprint of a user may be sensed using the fingerprint sensor 10, and the fingerprint sensor 10 may be implemented by a sensor sensing the entire region of the fingerprint of the user by using an on-screen method, but is not limited thereto, and may also be implemented using a fingerprint sensor using another method than the on-screen method.

In operation 902, the processor 130 estimates a spatial change trend of original contrast values in an original fingerprint image based on a contrast distribution of original contrast values of pixels of the original fingerprint image.

In detail, the processor 130 may perform estimation of a change trend by estimating characteristics of a probabilistic contrast distribution of the entire pixels of the original fingerprint image from the contrast distribution of the original contrast values. Here, the characteristics of the probabilistic contrast distribution may be obtained by using KDE by a kernel function. As described above, various types of functions such as Uniform, Triangle, Epanechnikov, Quartic, Triweight, Gaussian, Cosine may be used as the kernel function.

The characteristics of the probabilistic contrast distribution may be estimated based on a reference contrast value corresponding to an average of the original contrast values of peripheral pixels of each pixel of the original fingerprint image, and by using Equation 1 described above. The peripheral pixels may correspond to pixels that surround a pixel that is located at the center of the peripheral pixels.

In operation 903, the processor 130 generates a reference contrast map indicating reference contrast values regarding pixels determined based on the estimated spatial change trend. In detail, a result value of Equation 1 calculated in operation 902 is a reference contrast value of a pixel, and the reference contrast map includes information about a spatial change trend corresponding to the estimated characteristics of the probabilistic contrast distribution (that is, contrast data of the entire reference contrast values).

In operation 904, the processor 130 normalizes a contrast distribution of the original fingerprint image by comparing the original contrast values of the original fingerprint image with the reference contrast values of the reference contrast map. Normalization of a contrast distribution refers to a process of homogenizing a contrast distribution by removing the effect of a change in a contrast according to a previously estimated spatial change trend from an original fingerprint image such that a uniform contrast distribution of the original fingerprint image is obtained. As described above with reference to the normalization contrast map 803 of FIG. 8, normalization of a contrast distribution may be performed by calculating a contrast difference between original contrast values and reference contrast values of respectively corresponding pixels in the original fingerprint image (the original contrast map 801) and the reference contrast map 802.

In operation 905, the processor 130 generates a normalization fingerprint image having a normalized contrast distribution. That is, the normalization fingerprint image may be an image reconstructed such that each pixel of the original fingerprint image has a contrast value corresponding to the contrast difference (7) described above.

Meanwhile, the processor 130 may additionally perform smoothing on the normalization fingerprint image to remove noise.

When the normalization fingerprint image is generated (or when a noise removal process of the generated normalization fingerprint image is completed), the processor 130 may additionally perform fingerprint image processing to extract fingerprint pattern information such as a ridge, a valley, minutiae or the like from the normalization fingerprint image for user fingerprint authentication.

As described above, the fingerprint image processing performed subsequently may be processes of binarizing a fingerprint image through bandpass filtering performed on the normalized fingerprint image and extracting fingerprint pattern information related to a ridge, a valley, minutiae or the like from the binarized fingerprint image. For example, binarization of a fingerprint image may be performed using a short-time Fourier transform (STFT) method or other various methods without limitation.

Figure 10:
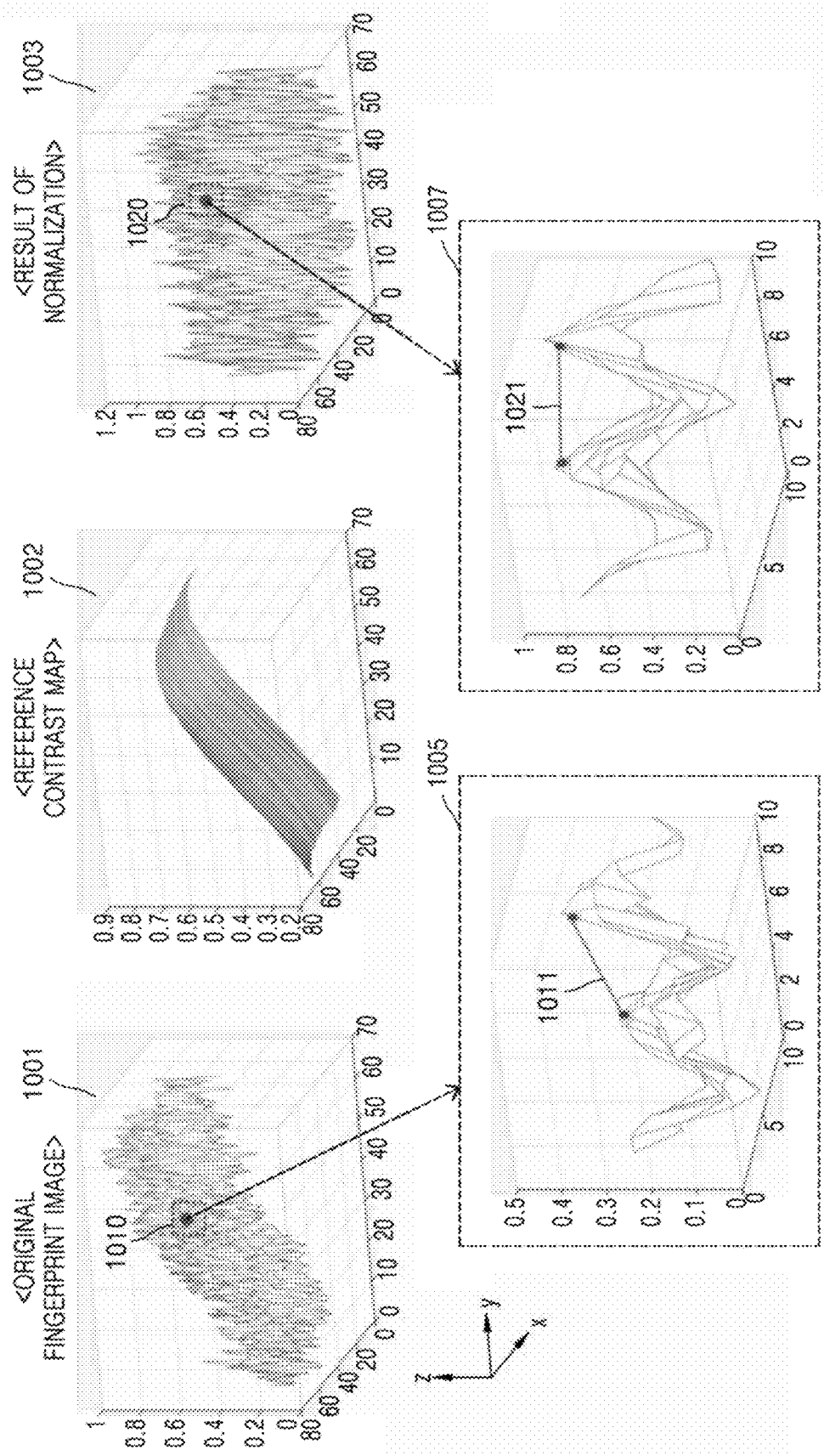
FIG. 10 is a diagram for describing a result of normalization of a contrast distribution of a fingerprint image, according to an embodiment.

FIG. 10 is a diagram for describing a result of normalization of a contrast distribution of a fingerprint image, according to an embodiment.

Referring to FIG. 10, in contrast data 1005 in a portion 1010 of an original contrast map 1001 of an original fingerprint image, there is a difference 1011 in contrast values between a ridge and an adjacent ridge thereto. That is, the original contrast map 1001 of the original fingerprint image has an overall contrast distribution in which a contrast value increases toward a certain region of the original contrast map 1001.

A reference contrast map 1002 shows a spatial contrast change trend estimated from the original contrast map 1001. The reference contrast map 1002 may represent a distribution of contrast values over the area of the original fingerprint image. The reference contrast map 1002 may be provided in a three-dimensional space having x, y, and z parameters, wherein x and y parameters indicate pixel coordinates of the original fingerprint image and z parameter indicates contrast values of the original fingerprint image.

As normalization is performed based on a difference in contrast values between the original contrast map 1001 and the reference contrast map 1002, a normalization distribution map 1003 may be generated. In contrast data 1007 in a portion 1020 of the normalization distribution map 1003 corresponding to the portion 1010 of the original contrast map 1001, there is hardly a difference in contrast values between a ridge and another adjacent ridge thereto. That is, according to the normalization distribution map 1003, contrast values of ridges are normalized to have nearly equal contrast values, and contrast values of valleys are also normalized to have nearly equal contrast values.

Figure 11:
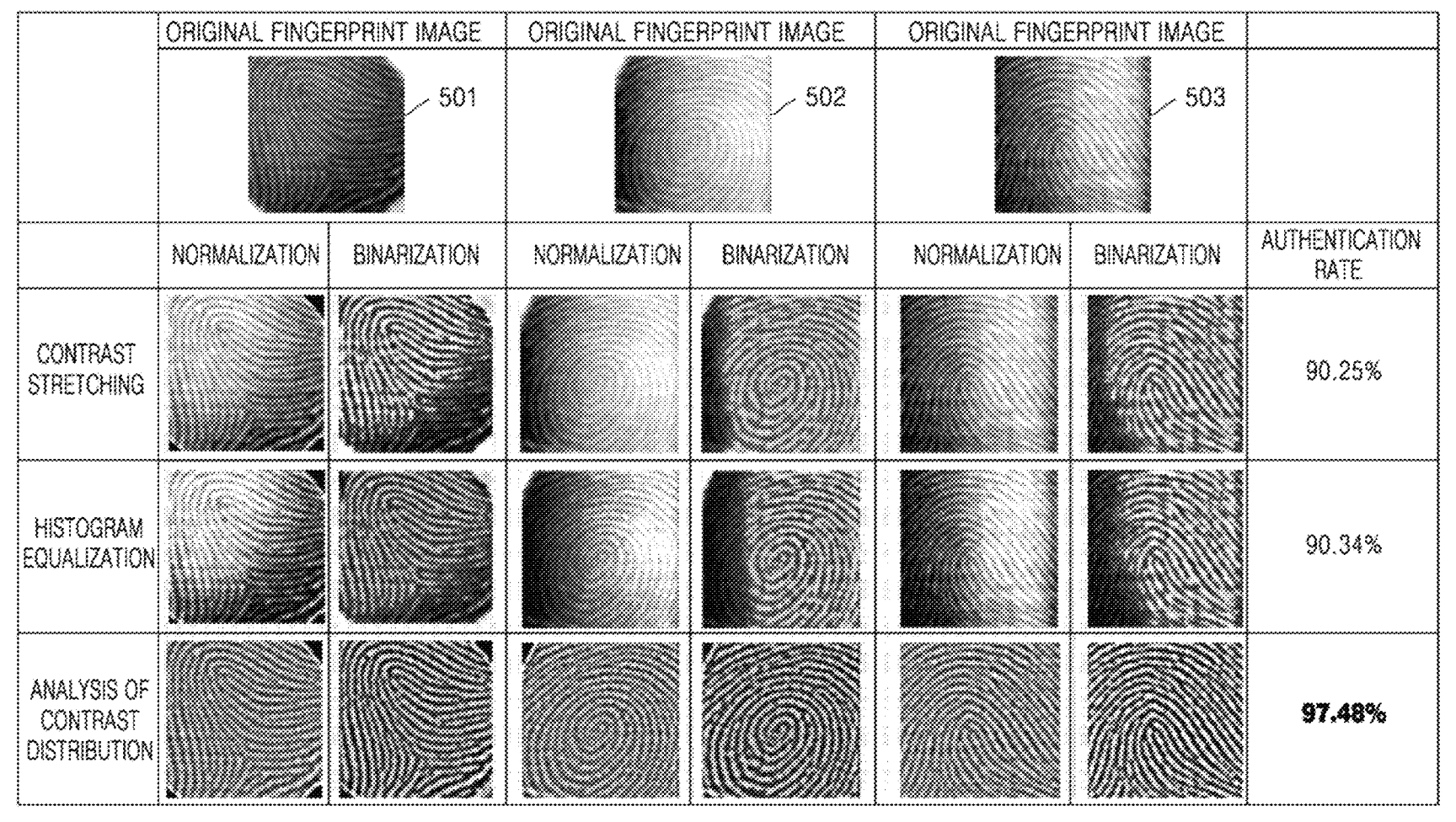

FIG. 11 is a diagram for comparing fingerprint recognition rates according to a result of image processing in the related art and the present embodiment, with respect to an original fingerprint image having a non-uniform contrast distribution according to an embodiment.

Referring to FIG. 11, results of simulation performed by assuming, for example, the fingerprint images 501, 502, and 503 described with reference to FIG. 5 to correspond to original fingerprint images are described. The original fingerprint images of FIG. 11 all have a non-uniform contrast distribution in which the image is brighter or darker toward a certain region.

Fingerprint image processing of normalization and binarization according to each of the contrast stretching technique and the histogram equalization technique, which are the related art, was performed on each of the fingerprint images 501, 502, and 503, and fingerprint authentication was performed on each of the fingerprint images 501, 502, and 503, and as a result, fingerprint authentication rates of 90.25% and 90.34% were measured.

In comparison with the fingerprint image processing according to the related art, fingerprint image processing of normalization and binarization according to the contrast distribution analysis according to the present embodiment was performed on each of the fingerprint images 501, 502, and 503, and fingerprint authentication was performed on each of the fingerprint images 501, 502, and 503, and as a result, a fingerprint authentication rate of 97.48% was measured. That is, by performing fingerprint image processing of normalization according to the contrast distribution analysis according to the present embodiment, a significantly higher fingerprint authentication rate than other methods according to the related art are achieved.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of processing a fingerprint image in an electronic apparatus, the method comprising:
   obtaining an original fingerprint image by sensing a fingerprint of a user;
   determining a contrast distribution of original contrast values of pixels of the original fingerprint image;
   generating a reference contrast map having reference contrast values based on the determined contrast distribution; and
   generating a normalization fingerprint image by normalizing the contrast distribution of the original fingerprint image based on the original contrast values and the reference contrast values.

2. The method of claim 1, wherein the normalizing the contrast distribution comprises normalizing the contrast distribution by removing an effect of a change in a contrast according to a spatial change trend of the original contrast values to homogenize the contrast distribution of the original fingerprint image.

3. The method of claim 1, wherein the normalizing the contrast distribution comprises normalizing the contrast distribution by calculating a contrast difference between the original contrast values and the reference contrast values of respective corresponding pixels in the original fingerprint image and the reference contrast map.

4. The method of claim 3, wherein the normalization fingerprint image comprises an image reconstructed such that each pixel of the original fingerprint image has a contrast value corresponding to the calculated contrast difference.

5. The method of claim 1, wherein the determining the contrast distribution comprises estimating characteristics of a probabilistic contrast distribution of all pixels of the original fingerprint image from the contrast distribution of the original contrast values.

6. The method of claim 5, wherein the estimating the characteristics of the probabilistic contrast distribution is based on kernel density estimation (KDE) by using a kernel function.

7. The method of claim 5, wherein
   the estimating the characteristics of the probabilistic contrast distribution is based on a reference contrast value corresponding to an average of the original contrast values of peripheral pixels of each pixel of the original fingerprint image, and wherein the reference contrast map comprises information about a spatial change trend corresponding to the characteristics of the estimated probabilistic contrast distribution.

8. The method of claim 1, further comprising performing smoothing on the generated normalization fingerprint image to remove noise.

9. The method of claim 1, further comprising performing image processing on the normalization fingerprint image to extract at least one of a ridge, a valley, and minutiae from the normalization fingerprint image.

10. A non-transitory computer readable storage medium storing a program that is executable by a computer to perform the method of claim 1.

11. An electronic apparatus for processing a fingerprint image, the electronic apparatus comprising:
a fingerprint sensor configured to obtain an original fingerprint image by sensing a fingerprint of a user; and
a processor configured to
determine a contrast distribution of original contrast values of pixels of the original fingerprint image,
generate a reference contrast map having reference contrast values based on the determined contrast distribution, and
generate a normalization fingerprint image by normalizing the contrast distribution of the original fingerprint image based on the original contrast values and the reference contrast values.

12. The electronic apparatus of claim 11, wherein the processor is further configured to normalize the contrast distribution by removing an effect of a change in a contrast according to a spatial change trend of the original contrast values to homogenize the contrast distribution of the original fingerprint image.

13. The electronic apparatus of claim 11, wherein the processor is further configured to normalize the contrast distribution by calculating a contrast difference between the original contrast values and the reference contrast values of respective corresponding pixels in the original fingerprint image and the reference contrast map.

14. The electronic apparatus of claim 13, wherein the normalization fingerprint image comprises an image reconstructed such that each pixel of the original fingerprint image has a contrast value corresponding to the calculated contrast difference.

15. The electronic apparatus of claim 11, wherein the processor is further configured to determining the contrast distribution by estimating characteristics of a probabilistic contrast distribution regarding all pixels of the original fingerprint image from the contrast distribution of the original contrast values.

16. The electronic apparatus of claim 15, wherein the characteristics of the probabilistic contrast distribution are obtained based on kernel density estimation (KDE) by using a kernel function.

17. The electronic apparatus of claim 15, wherein the characteristics of the probabilistic contrast distribution are estimated based on a reference contrast value corresponding to an average of the original contrast values of peripheral pixels of each pixel of the original fingerprint image, and
wherein the reference contrast map comprises information about a spatial change trend corresponding to the characteristics of the estimated probabilistic contrast distribution.

18. The electronic apparatus of claim 11, wherein the processor is further configured to further perform smoothing on the generated normalization fingerprint image to remove noise.

19. The electronic apparatus of claim 11, wherein the processor is further configured to further perform image processing to extract at least one of a ridge, a valley, and minutiae from the normalization fingerprint image.

20. The electronic apparatus of claim 11, wherein the fingerprint sensor comprises a sensor configured to sense all regions of the fingerprint of the user by using an on-screen method.

* * * * *